United States Patent [19]

Westerholm et al.

[11] Patent Number: 5,684,996
[45] Date of Patent: Nov. 4, 1997

[54] METHOD AND ARRANGEMENT FOR REDUCING THE AMOUNT OF INFORMATION NECESSARY FOR SOFTWAY INSTALLATION

[75] Inventors: Ville Westerholm, Espoo; Erkki Riekkola, Vantaa, both of Finland

[73] Assignee: ICL Systems AB, Kista, Sweden

[21] Appl. No.: 244,395

[22] PCT Filed: Nov. 27, 1992

[86] PCT No.: PCT/SE92/00826
§ 371 Date: May 19, 1994
§ 102(e) Date: May 19, 1994

[87] PCT Pub. No.: WO93/11495
PCT Pub. Date: Jun. 10, 1993

[30] Foreign Application Priority Data

Nov. 27, 1991 [SE] Sweden ................... 9103512

[51] Int. Cl.⁶ .................................................. G06F 7/44
[52] U.S. Cl. .................................... 395/712; 395/653
[58] Field of Search ........................... 395/700, 653, 395/651, 712

[56] References Cited

U.S. PATENT DOCUMENTS

| | | | |
|---|---|---|---|
| 4,558,413 | 12/1985 | Schmidt et al. | 395/700 |
| 5,008,814 | 4/1991 | Mathur | 395/700 |
| 5,247,683 | 9/1993 | Holmes et al. | 395/700 |
| 5,367,686 | 11/1994 | Fisher et al. | 395/700 |

FOREIGN PATENT DOCUMENTS

| | | |
|---|---|---|
| 0 241 678 | 10/1987 | European Pat. Off. . |
| 0 398 647 | 11/1990 | European Pat. Off. . |
| 0 509 945 | 10/1992 | European Pat. Off. . |
| 2 189 061 | 10/1987 | United Kingdom . |

OTHER PUBLICATIONS

Nieng, "Updating Software In A Real-Time Distributed System", National Electronics Conference, vol. 38, 1984, pp. 57–60.

Primary Examiner—Kevin A. Kriess
Attorney, Agent, or Firm—Lee, Mann, Smith, McWilliams, Sweeney & Ohlson

[57] ABSTRACT

A system and method for achieving unitary installation of software at each time software is installed in user units of a distributed computer system. A specially adapted recipe is created from a general recipe which has fewer questions than the general recipe, or even no questions at all. This requires less information, or no information, from the user. This specially adapted recipe may either be used to achieve unitary installation of a program product in a plurality of mutually similar units of a computer system. The method enables a specially adapted installation recipe or configuration recipe to be created which can be re-used for manually, semi-automatically or fully automatically creating, installing or reconfiguring software. This reduces the total work in creating and/or installing a plurality of software programs or reconfiguring existing software while being aware of how these were created and/or installed or configured.

8 Claims, 4 Drawing Sheets

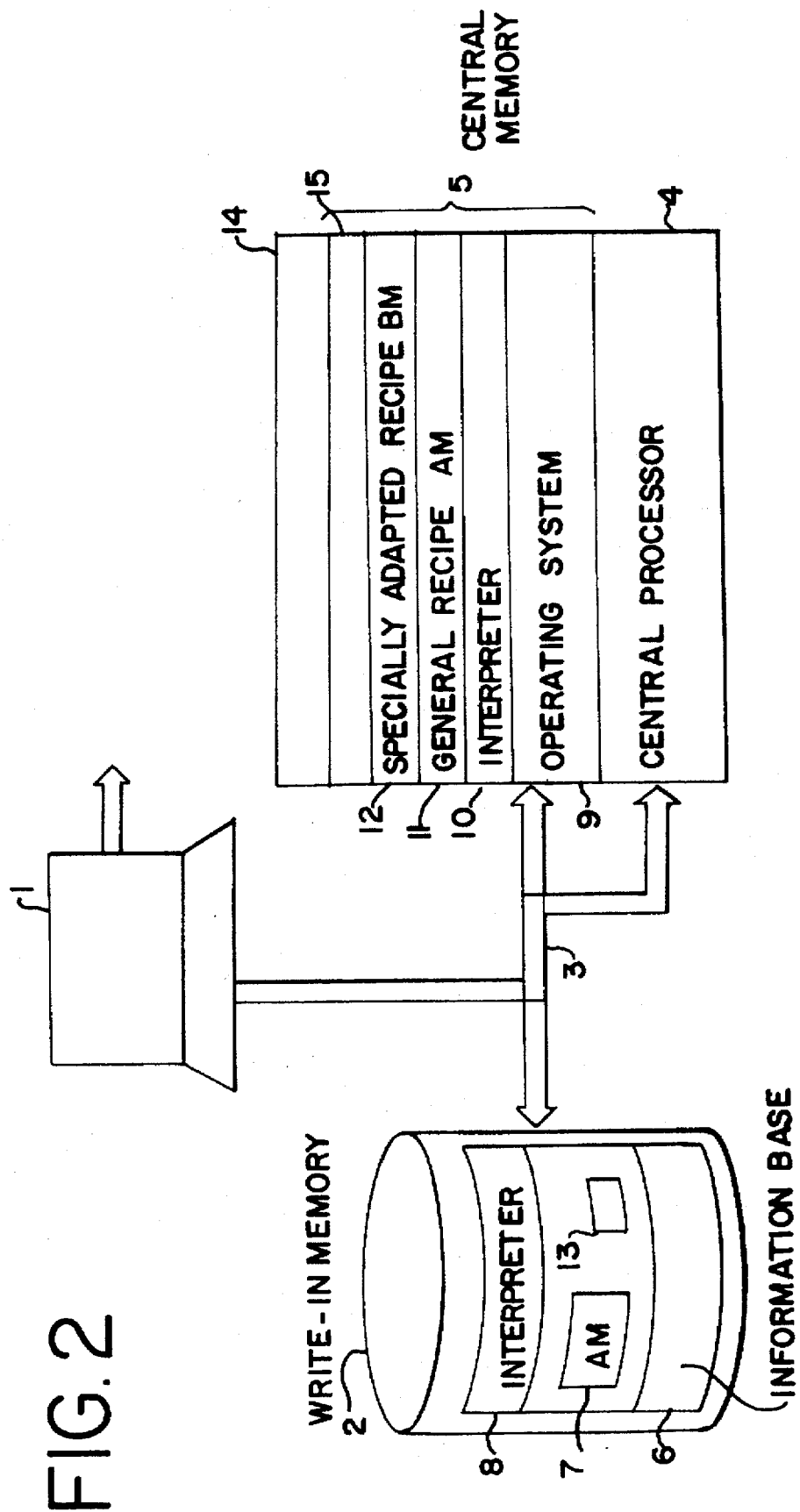

METHOD AND ARRANGEMENT FOR REDUCING THE AMOUNT OF INFORMATION NECESSARY FOR SOFTWAY INSTALLATION

This application is a 371 of PCT/SE92/00826 filed on Nov. 27, 1992.

The present invention relates to a method for producing from a general manuscript a specially adapted manuscript whose use requires less information than the use of the general manuscript.

DEFINITIONS

Given below is a list of the expressions used in the present document and their meaning:

administrator
a person who administers a computer system
information base
a computer stored data base which contains some type of information
interpreter
a program which can convert one data structure to another data structure
recipe
special information or help software which describes how a given software shall be revised, i.e. created, installed, de-installed, changed and/or configured on a computer, and the information required to execute this
mass revision
revision of the same software in a large number of units of a computer system
gateway
a device which mutually connects two communication networks which use different communication protocol, i.e. a "protocol converter"
bridge
a simplified gateway which can be used to mutually connect two homogenous local communication networks.

BACKGROUND ART

When installing software in computer systems, the same installation process has been repeated traditionally for each unit in the computer system into which the software shall be installed. Consequently, the installation information required, which is normally obtained by putting questions to the user, must be given time and time again, which is both time consuming and involves the risk of error. Furthermore, this procedure will often result in the installations not being carried out identically—an inhomogenous system is obtained which can later lead to problems when, for instance, reconfiguring or updating the software. This particularly applies when installing software in computer system which comprise a large number of mutually similar units in which it is desired to install a software in a unitary manner.

Since the various user units often work individually alternatively disconnected from and connected to the system and can then send from the system data that has been created by software installed in the unit, it is very important that the data has been fully adapted to the distributed computer system. Otherwise errors can occur which are difficult to unravel and rectify. For instance, it is relatively usual for a program manufacturer to insert changes in marketed software. This modified software is often sold together with an installation program without mention of the changes made. When such newly purchased software is installed with the aid of its installation program in one individual user unit, it is very difficult to determine or to trace the changes that have been made. This can result in "unexplainable" errors in the system.

Thus, the technical problem in need of a solution resides in the provision of an easy method of ensuring that data, such as software or some other type of information, e.g. certain text files, are installed in a unitary manner in user units coupled to a distributed computer system.

OBJECTS OF THE PRESENT INVENTION

The main object of the present invention is to provide a method of achieving unitary installation of software each time software shall be installed in some of the user units connected to the distributed computer system.

Another object of the present invention is to simplify and homogenize the installation of software in an error-free fashion to the greatest possible extent. This may apply to mass installation, irrespective of whether the installation is effected manually, semi-automatically or automatically, i.e. without any assistance from the user.

The main object of the invention is achieved with a method of the kind defined in the characterizing clause of claim 1. Further features of the inventive method and further developments thereof are set forth in the depending claims. An arrangement for carrying out the method is set forth in the following apparatus claims.

According to the invention there is created from a general recipe a specially adapted recipe which has fewer questions than the general recipe, or even no questions at all. This requires less information, or no information, from the user. This specially adapted recipe may either be used to achieve unitary installation of a program product in a plurality of mutually similar units of a computer system.

The invention enables a specially adapted installation recipe or configuration recipe to be created which can be re-used for manually, semi-automatically or fully automatically creating, installing or reconfiguring software. This reduces the total work in creating and/or installing a plurality of software programs or reconfiguring existing software while, at the same time, being aware of how these were created and/or installed or reconfigured.

Furthermore, when all questions in a recipe have been answered, the inventive method and the inventive arrangement enable installation to be effected fully automatically, since the recipe is interpreted and carried out by a machine, such as a computer, without the assistance of the user.

BRIEF DESCRIPTION OF THE DRAWINGS

So that the invention will be readily understood and can readily be put into effect, the invention will now be described with reference to exemplifying embodiments thereof and also with reference to the accompanying drawings, in which:

FIG. 2 illustrates a computer arrangement capable of carrying out the inventive method.

DESCRIPTION OF EXEMPLIFYING EMBODIMENTS

Figure 1A:
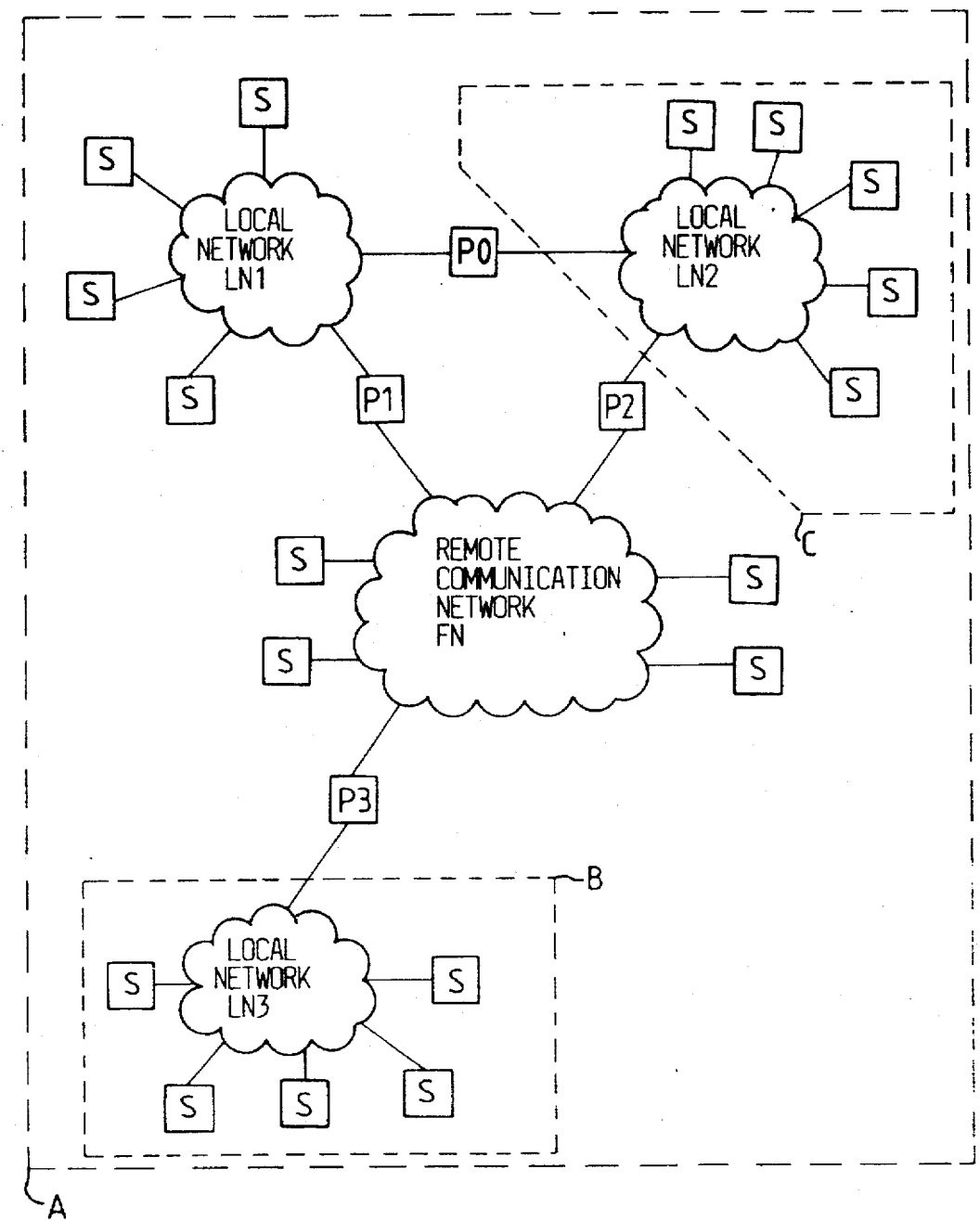
FIG. 1A illustrates a computer system arrangement in which a program product shall be installed.

FIG. 1A illustrates an example of a computer system arrangement A, in which a program product shall be installed. The system A includes three local networks (LAN) LN1, LN2, LN3. A plurality of stations S are connected to each local network LN1-LN3. A station S may, for instance, be a terminal, a personal computer or a workstation. The local networks LN1 and LN2 are mutually connected via a bridge PO.

The local networks LN1, LN2, LN3 are connected with a remote communication network (WAN) FN through respective gates P1, P2 and P3. Part of the system A, part system C, includes the local network LN2 and the stations S connected thereto, while another part of the system A, part system B, includes the local network LN3 and the stations S connected thereto. The part system C may, for instance, be located in Sweden and the part system B located, for instance, in the USA.

A recipe may be a paper which describes the procedure or, even better, may comprise descriptions that can be interpreted by a machine, as in the case of the illustrated embodiment. A special recipe language can be used when writing the recipe, this latter facilitating the automatic conversion and execution of the recipe.

A recipe may include language constructions for the following functions:

area tests for obtaining installation information, for instance with respect to operative systems, existing program products, system configuration, free disc memory;
  user selection for controlling the installation stream;
  user input data, for instance digital data or text strings;
  file copying;
  file revision;
  show information texts;
  execution of other programs.

The inventive method is primarily concerned with user selection and user input data, i.e. the user dependent parts of the recipe language.

Figure 1B:
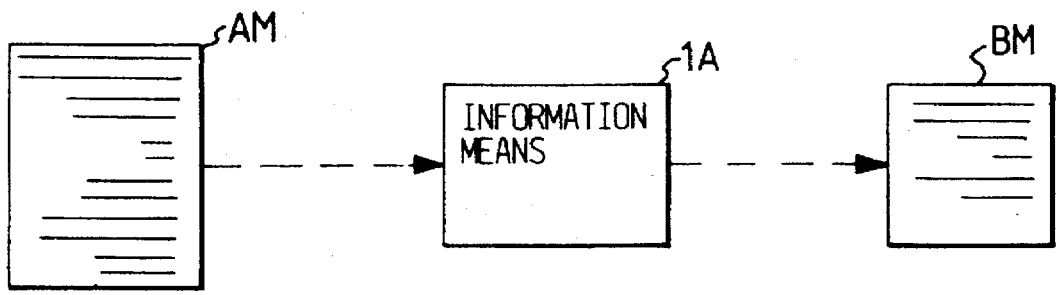
FIGS. 1B and 1C illustrate the manner in which an installation manuscript can be converted through the medium of an information means.
Figure 1C:
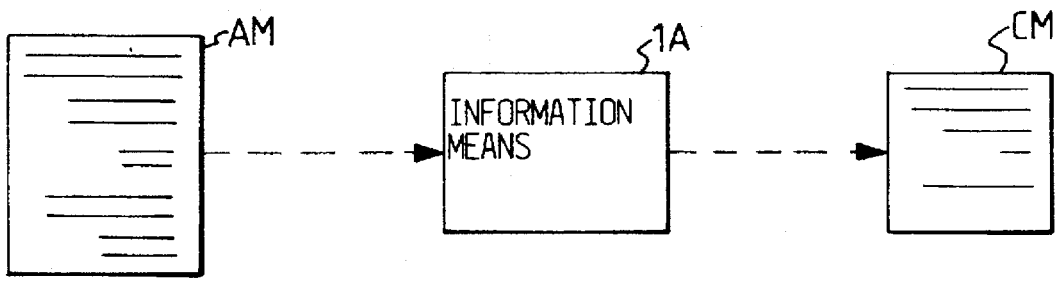

Figure 1B illustrates an installation manuscript AM, which can be converted to a specially adapted installation recipe BM via an information means 1A. FIG. 1C illustrates an installation recipe AM which can be converted to another specially adapted installation recipe CM, via the information means 1A. A more detailed description will be given below.

A recipe may consist of a sheet of text-carrying paper, wherein the text describes in a structured manner how installation shall be effected. The contents of this paper sheet can then be stored in the memory of a computer with the aid of a read scanner. Alternatively, a recipe may consist of a data file stored in the memory of a computer or on a "floppy" disc. The information means 1A may, for instance, involve a person who is able to deliver information via an infeed device (for instance a keyboard). Alternatively, the information means 1A may include a data-stored information base and/or those parts of an operating system capable of answering questions concerning the composition of the computer system. According to still another alternative, the information means 1A may include a knowledge-based system, for instance an expert system, having the information required to answer some or all questions or having knowledge of where the information can be derived. A combination of the aforesaid alternatives is also possible.

In the case of the illustrated exemplifying embodiment, the recipe AM applies to the whole of system A, i.e. the program product to which the recipe AM relates can be installed in all stations in system A, by following the instructions given in the recipe AM. The same applies to recipes BM and CM and part systems B and C.

Installation of the program product in the remaining stations can be effected by using the recipe AM, or a further recipe can be produced for stations S which are similar to one another from one aspect.

The aforedescribed example of the computer system arrangement forms a a basis for the following more detailed description of how a specially adapted software installation recipe can be obtained so as to enable the installation to be effected in a simple, time-saving and error-tolerant fashion while nevertheless taking into account the dissimilarities found between parts of the system.

COMPUTER ARRANGEMENT

The exemplifying embodiment of a computer arrangement illustrated in FIG. 2 comprises a computer unit which includes an administrator unit 1, which coacts with a disc memory 2, which is a write-in non-volatile memory. The administrator unit 1 is connected to a central processor 4 and to a central memory 5 belonging to the processor 4 and also to the disc memory 2, via a bus 3. The disc memory 2 stores an information base, a general recipe AM and an interpreter in different memory areas 6, 7 and 8.

Among other things, the information base may contain information concerning the different user units in the system, so as to enable questions asked about these units to be answered easily. When preparing the specially adapted recipe, information can either be transferred between the disc memory 2 and the central memory 5 when answering the questions, or that part of the information base concerned with an applicable type of user unit can be transferred to a memory area 15 in the central memory.

The central memory 5 stores an operating system, the same interpreter as that stored in the disc memory 2, and the same general recipe AM and a specially adapted recipe BM in different memory areas 9, 10, 11, 12.

Furthermore, both the disc memory and the central memory may have respective memory areas 13 and 14 which are at disposal for later storage and which therefore have no information stored therein. When a specially adapted recipe is to be created, a signal to this effect is sent by the administrator unit 1 to the central processor 4. The central processor 4 effects the transfer of the memory content 6;AM;8 of the disc memory 2, via the bus 3, to the central memory 5 for storage therein.

According to the present invention, the operating system in the memory area 9 includes file handling facilities, such as file copying and file transfer between the disc memory and the central memory. By using these facilities in the operating system in the memory area 9, the central processor 4 creates a copy of the general recipe AM and inserts it into the memory area 11. This copy of the general recipe is processed in a manner described in more detail herebelow with reference to FIG. 3. The result obtained by processing the general recipe is first stored as a specially adapted recipe BM in the memory area 12 of the central memory 5. The result is then transferred to the disc memory 2 for storage in the memory area 13. FIG. 2 illustrates the state of the computer unit immediately before the file containing the finished-process copy, i.e. the specially adapted recipe BM, is to be transferred from the central memory 5 to the disc memory 2.

Furthermore, the interpreter in memory area 8 is inserted into the central memory 5 and repeatedly searches for questions in the copy of the general recipe in the memory area 11 of the central memory 5 and coacts with the information base stored in the memory area 6 of the disc memory 2. The information in the information base is used to answer or to change questions in the copy of the general recipe stored in the central memory 5.

Illustrated in FIG. 2 is an output signal from the administrator unit 1 on one side thereof. If data in different user units is to be revised manually, the created, specially adapted recipe can be taken from the administrator unit 1, for instance, in the form of a storage on a "floppy" disc or the like. On the other hand, if internal mass revision is to be carried out, the data with its recipe can either be delivered to the system, via the bus 3, which is the most likely, or the administrator unit 1 may transmit said data and recipe on a separate bus.

FLOW DIAGRAM

Figure 3:
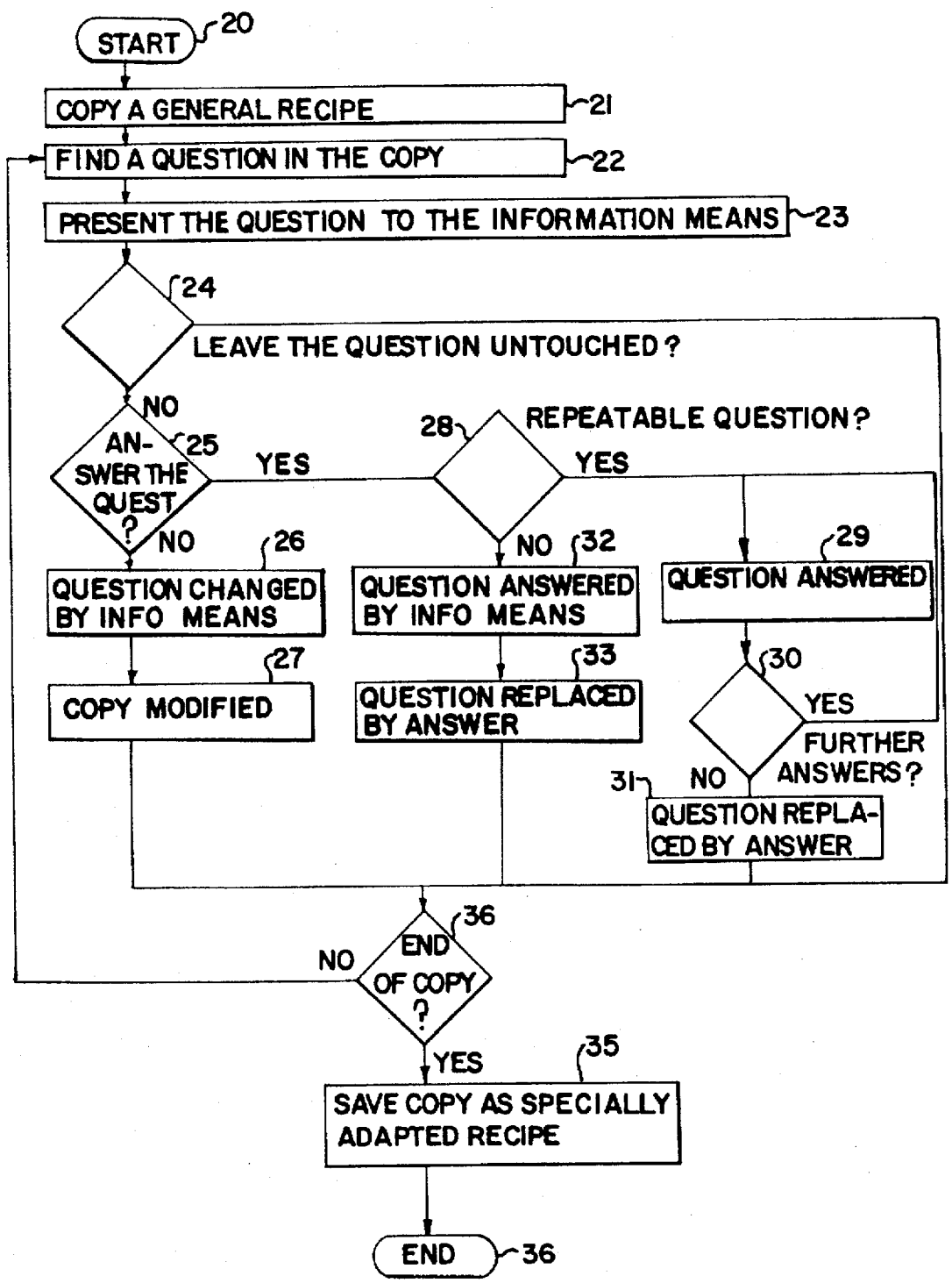
FIG. 3 is a flow sheet illustrating the inventive method.

An exemplifying embodiment of a method for producing a general recipe in accordance with the invention will now be described with reference to FIG. 3. This working method is illustrated in the form of a flow diagram.

S 20.
The method is commenced.

S 21.
A general recipe is copied with the intention of working with this copy at a later time and to leave the original general recipe untouched, among other things so that a plurality of specially adapted recipes can be created from one and the same general recipe. If the recipe is stored in a computer memory in the form of data files, which is to be preferred, the copy can be obtained by file copying.

S 22.
A repeated search is made of the copy, in order to find one of the questions found in the copy.

S 23.
The question is presented to an information device 1.

S 24.
The information means can elect to leave the question untouched, according to the YES-branch, in which case the question in the copy is left untouched and the control passes to a decision step 34.

S 25.
If the information means elects to answer/change the question, according to the NO-branch in S 24, a question is made as to whether or not the question shall be answered. If the question shall be answered, the control passes to a decision step S 28.

S 26.
If the question shall be changed, the control passes via the NO-branch, to S 26, where the question is changed by the information means. In S 26 the information means can change the question by giving a new pre-set answer or an answer alternative, or by reducing the number of answer alternatives.

S 27.
The question set-up in the copy can be modified in accordance with the changes made by the information means, whereafter control passes to a decision step 34.

S 28.
A check is made in the decision step S 28 as to whether or not the question is a repeatable question.

S 29.
If the answer is YES, the question is answered by the information means.

S 30.
After step S 29, the control passes to a decision step S 30. In this step a check is made as to whether or not several answers shall be given, for instance in order to obtain a list with input data. If the question is to be repeated, i.e. several answers shall be given, the control passes back to step S 28.

S 31.
When all answers have been given, the control passes, via the NO-branch, to a step S 31 in which the repeatable question is replaced by those answers that have been given. Control then passes to the decision step S 34.

S 32.
When the answer in the decision stge S 28 is NO, the control passes, via the NO-branch, to a step S 32, in which the question is also answered by the information means.

S 33.
Since the question is not repeatable according to S 28, and because the question is answered by the information means in S 32, the question in the copy of the general recipe is replaced with the answer given. Control then passes to the decision step 34.

S 34.
In this step a check is made as to whether or not the search is complete, i.e. whether or not all question set-ups have been found and presented to the information means. If so is the case, the control passes to S 35.

S 35.
In this step the copy is saved as the specially adapted recipe.

S 34.
If the copy search is not complete (answer NO), the control passes back to step 22.

S 36.
The method is terminated.

The method is preferably implemented as a computer program stored in the memory of a computer as an interactive interpreter, i.e. a program which is capable of converting, in cooperation with an information means, a data-stored general recipe to a data-stored specially adapted recipe by using the inventive method. If all questions have been answered, this enables the specially adapted recipe to be interpreted automatically by, for instance, a computer detail with reference to Appendixes 1, 2 and 3. Appendix 1 illustrates an example of a general recipe AM in the form of structured text for the installation of a program product in the computer system arrangement of FIG. 1. Appendix 2 illustrates a specially adapted recipe BM in the form of structured text for the installation of a program product in the computer system arrangement of FIG. 1, said recipe being produced from the recipe illustrated in Appendix 1. Appendix 3 illustrates another specially adapted recipe CM in the form of structured text for the installation of a program product in the computer system arrangement of FIG. 1, said recipe being obtained from the recipe illustrated in Appendix 1.

A GENERAL RECIPE

The recipe AM in Appendix 1 describes with the aid of structured text in a recipe language how a program product "Editor OS/2" shall be installed in system A. The recipe language is constructed so as to enable it to be readily stored, interpreted and processed by a computer. On line 1 the beginning of the recipe is headed "[[main]]", and the following five lines describe the program product and the recipe itself, which information can be stored in a directory or an information base covering installed program products and recipes. "[Default]" and the structure on the following line disclose default values for use in user interaction. Source obtains the value A:\\, which is the directory from which the copy of the program product shall be made and Target obtains the value C:\\, which is the directory to which the program product shall be copied. The following two lines indicate that when the installation is carried out in accordance with the recipe, information is requested from the installer as to from where the copy shall be made. The pre-set value ("A:\\") is used and the installer need only confirm this, provided that it was correct. The following four lines state the part procedures to be carried out and in which order.

The part-method "CopyFiles" that the user (installer) is required to disclose the directory into which the program product shall be copied—when executing the recipe, the pre-set value ("C:\\") is shown. "Files . . . " denotes the actual copying of one or more files from Source to Target.

Part-method "UserInteraction" states that the user is required to disclose the type of keyboard and the type of monitor used by the station in which the program product shall be installed.

The part-method "EditSystem" states on the first three rows that the Editor can be shared by several users, and in the following four rows states that the date file explaining how the Editor is configured shall contain information concerning the type of keyboard and monitor used.

When this recipe AM is used for installation, the user will be required to give the following information for each station in which instsallation shall take place:
State directory from where the program product shall be collected
State directory in which the program product shall be installed
Choose keyboard type
Choose monitor type.

SPECIALLY ADAPTED RECIPE

The recipe BM illustrated in Appendix 2 and specially adapted to the part-system B in FIG. 1 is derived/converted from the recipe AM. Compared with the recipe AM in Appendix 1, the differences reside in:
that it is unnecessary to state the directory from which/to which the program product is copied, since this is known and is the same for all stations in part-system B, namely the pre-set directory ("A:\\" and "C:\\" respectively);
that the keyboard type need not be chosen by the user, since all stations in the part-system B have the same type of keyboard, naely KeyBoardType "USA";
that the monitor type need not be chosen by the user, since all stations in the part-system B have the same monitor type, namely "MacPlus".

The end result is that no further information is required from the installer when installing the program product on the stations S in part-system B, since the installation recipe BM is specially adapted for this part-system. The installation process can be initiated by an administrator and carried out automatically, instead of being effected at each station by an installer.

The recipe CM illustrated in Appendix 3 is similarly specially adapted to part-system C and may similarly be used for automatic software installation without user interaction.

The inventive method and the inventive arrangement thus use an interpreter which functions to interpret recipes that are written in a specific language. In cooperation with an information means, the interpreter is able to create a new recipe from another recipe, this new recipe having one, several or all of the questions answered in the second recipe, and/or modified questions. For instance, the information means may be a computer unit comprising a memory in which an information base is stored. The information in the information base may contain information concerning the computer system in which the program product shall be installed.

Alternatively, the information means may be an administrator having access to information, for instance manuals, documentation etc., which describes the computer system and which supplies desired information to be memory of the computer unit. It should be noted that it is not necessary to answer all questions.

The method can be repeated to create a hierarchy of specially adapted recipes, i.e. a specially adapted recipe can be used to create another specially adapted recipe, until all questions have been eliminated. This possibility is important, particularly when the administrator administrates a large computer system, i.e. a computer system which includes many units, and when the computer system can be divided into groups of units which are unitary in some respect or other, for instance with regard to the type of screen used.

For instance, a computer system may include two local networks, one network which consists solely of Mac-Intosh-units and one network which consists solely of IBM-units, wherein a specially adapted recipe can be produced for each of the networks. If, for instance, the Macintosh-units have several different keyboard types, these units can, in turn, be divided into groups (according to the type of keyboard used) and a recipe can be created for each of these groups from the recipe that was created for the network containing the Macintosh-units.

When all questions in the recipe have been answered, the process described by the recipe can be carried out fully automatically—without further information being asked for. For instance, when the recipe describes a software installation routine and all questions have been eliminated, installation can be carried out automatically without user interaction. Whether or not all questions can be pre-answered will depend on the properties of the software that is to be installed/configured and also on the properties of the computer system in which the software shall be installed/configured.

Thus, the information means can be arranged to pre-answer the questions automatically. The information means then includes a data-stored data base containing information concerning the computer system in which the installation shall take place. This information base, for instance, may be delivered with the computer system, or subsequently inserted, via an infeed device, by an administrator having access to system information. In this case, the stream is:
1) If the information base contains the answer—use this answer;
2) If the interpreter can obtain the answer by coaction with the operational surroundings or area, for instance the operating system—use this answer;
the method can optionally also be carried out semiautomatically with the assistance of an administrator which answers the questions remaining after 1) and 2) above.

SPECIALLY ADAPTED INSTALLATIONS

In some cases there is a need to simplify the installation method. One example in this respect is when a client only has one type of monitor and the installation method asks for the type of monitor used. The administrator employed by this client can remove this question, by specially adapting the installation method.

In the case of the exemplifying embodiment, a specially adapted recipe can be obtained by eliminating or modifying program sets in the recipe file and by creating a new recipe in another file. The interpreter looks through the recipe file for questions put to the user and directs these questions to the information means, which is able to answer, change or skip the question. If the information means produces an answer, the whole of the question is removed from the recipe file and when the recipe is later used the installation will be effected in the same way as though the user himself had given the predefined answer.

The information means can modify questions in the following way:

a) If it is a question with an alternative, the pre-set alternative can be changed, the number of alternatives can be reduced or the entire question can be eliminated by choosing one of the alternatives.

b) If the question concerns input data, such as a text string or a number, the pre-set answer can be changed or the question eliminated by giving the answer.

c) If a repeatable question is asked, i.e. a question which is repeated as many times as the user wishes, the entire question can be eliminated when the question is irrelevant or a copy of the question can e modified/eliminated a desired number of times according to b) or c).

A repeatable question may, for instance, ask for a list of the values, for instance the printers to which the software to be installed/to be configured shall have access to (printer options). The question to be modified/eliminated may, in the case of the present example, read "State the printer to which the program shall have access:", this question being repeated the necessary number of times. The question can be totally eliminated when the software shall not have access to a printer. In other cases, the question is repeated on each necessary occasion, wherein each "copy" of the question can be pre-answered. In the case of the present example, the answer may be "LaserJet IIID" the first time the question is put, "ImageWriter 2.7" the second time the question is put, whereafter no more printer questions are desired. The repeatable question is then replaced by the two answers.

---

APPENDIX 1

```
[[main]]
    ProductId = "Example product"
    Product Name   = "Editor OS/2"
    Version ID = "1.0"
    ScriptID       = "SCRIPTID"
    ScriptVer = "1"
    [Default]
        DeclVar    = Source "A:\\"
                     Target "C:\\"
    [Directory]
        QuerySource = Source
    [Execute]
        Procedures =   CopyFiles
                       UserInteraction
                       EditSystem
[[end main]]
[[CopyFiles]]
    [Copy]
        QueryVar = Target
                     "Specify full path." Target
```

-continued

APPENDIX 1

```
        Files = Source Target
[[end CopyFiles]]
[[UserInteraction]]
    [Interact]
        SelectValue =
        KeyBoardType "Select keyboard layout :"
        "USA"        "United States"
        "SWE/FIN"    "Sweden/finland"
        "UK"         "United Kingdom"
        "CHINA"      "China"
    [Interact]
        SelectValue =
        MonitorType "Select monitor type :"
        "S13"        "Salora 13 inch"
        "VT1"        "Vt 100 terminal"
        "VT2"        "Vt 200 terminal"
        "MacPlus"    "MacPlus screen"
[[end UserInteraction]]
[[EditSystem]]
    [Edit]
        File = STARTUP
        Add = "\NET SHARE EDITOR=@Target@\
    [Edit]
        File = Source\\SetUp
        Add = "KeyBoard = @KeyBoardType@"
        Add = "Monitor = @MonitorType@"
[[end EditSystem]]
```

---

APPENDIX 2

```
[[main]]
    ProductId = "Example product"
    Product Name   = "Editor OS/2"
    Version ID = "1.0"
    ScriptID       = "SCRIPTID"
    ScriptVer = "1"
    [Default]
        DeclVar    = Source "A:\\"
                     Target "C:\\"
    [Execute]
        Procedures =   CopyFiles
                       UserInteraction
                       EditSystem
[[end main]]
[[CopyFiles]]
    [Copy]
        Files = Source Target
[[end CopyFiles]]
[[UserInteraction]]
    SetVar = KeyBoardType "USA"
    SetVar = MonitorType "MacPlus"
[[end UserInteraction]]
[[EditSystem]]
    [Edit]
        File = STARTUP
        Add = "\NET SHARE EDITOR=@Target@\
    [Edit]
        File = Source\\SetUp
        Add = "KeyBoard = @KeyBoardType@"
        Add = "Monitor = @MonitorType@"
[[end EditSystem]]
```

---

APPENDIX 3

```
[[main]]
    ProductId = "Example product"
    Product Name   = "Editor OS/2"
    VersionID = "1.0"
    ScriptID       = "SCRIPTID"
    ScriptVer = "1"
    [Default]
```

APPENDIX 3

```
DeclVar    = Source "A:\"
           Target "C:\"
   SetVar  = Source "FLOPPY:\EDIT.EXE"
[Execute]
   Procedures =  CopyFiles
                 UserInteraction
                 EditSystem
[[end main]]
[[CopyFiles]]
   [Copy]
      SetVar = Target "HARDDISK:\EDITOR"
      Files = Source Target
[[end CopyFiles]]
[[UserInteraction]]
      SetVar = KeyBoardType "SWE/FIN"
      SetVar = MonitorType "S13"
[[end UserInteraction]]
[[EditSystem]]
   [Edit]
      File = STARTUP
      Add = "\NET SHARE EDITOR=@Target@\
   [Edit]
      File = Source\\SetUp
      Add = "KeyBoard = @KeyBoardType@"
      Add = "Monitor = @MonitorType@"
[[end EditSystem]]
```

We claim:

1. A method for achieving uniform revision, such as installation, deinstallation or change, of data in a number of user units which are connectable to a distributed computer system, each time revision shall be effected in said units, comprising the steps of:

storing a general revision recipe containing a number of questions in a first user unit in the computer system;

creating a specially adapted revision recipe, by processing the general revision recipe in the first user unit with the assistance of an information means, said specially adapted revision recipe including a smaller number of questions than the general revision recipe, revising data in second, mutually similar user units, with the aid of the specially adapted revision recipe which requires less or no further information when carrying out the revision, therewith producing uniform revision of data, such as a program product, in a plurality of second user units in the computer system, and said information means producing the answers, to the questions that are answered to produce the specially adapted revision recipe, with the aid of information in a data base concerning the user unit or user units to which the specially adapted recipe shall be adapted.

2. A method according to claim 1, including the steps of:
(a) copying the general recipe;
(b) searching through the copy and for each question found passing the question to a said information means which at least includes the possibility of either answering the question, in which case the question in the copy is replaced by the answer given, or of leaving the question unanswered, in which case the question in the copy is left unanswered; and
(c) saving the modified copy of the general recipe as the specially adapted recipe after having searched through the entire copy.

3. A method according to claim 2, wherein step b) also includes the possibility of the information means reducing the number of answer alternatives in the case of a question having given answer alternatives, in which case the question in the copy of the general recipe is modified so as not to include undesirable alternatives.

4. A method according to claim 2, wherein step b) also includes the possibility for the information means to change a preset answer to a question that has no given answer alternatives, in which case the question in the copy of the general recipe is modified in a manner to present this answer as a preset answer.

5. A method according to claim 2, wherein step b) also includes the possibility for the information means to change a pre-set answer alternative to a question having given answer alternatives, in which case the question in the copy of the general revision recipe is modified to have this answer alternative as the pre-set answer alternative.

6. A method according to claim 2, wherein step b) also includes the possibility for the information means to eliminate a repeatable question, in which case the question in the copy of the general recipe is eliminated.

7. A method according to claim 2, wherein in the case of a repeatable question, the step b) also includes the possibility for the information means to give at least one answer to the question, in which case the question in the copy of the general recipe is replaced by the answer or answers given by the information means.

8. A computer system arrangement, comprising a plurality of computer units, wherein uniform revision, such as installation, deinstallation or change to data in some user units connectable or connected to a distributed computer system, can be achieved each time that revision takes place in said user units, wherein the computer system arrangement includes at least one said computer unit which is able to cooperate with a central memory and a write-in memory that possesses non-volatile storage facilities, and wherein a) a general recipe which includes a plurality of questions is stored as a data file in the non-volatile memory and can be loaded over to the central memory;

b) the central memory has stored therein an operating system which includes file copying possibilities such as to enable the general recipe stored in the central memory to be copied;

c) the arrangement includes an interpreter which is inserted from the non-volatile memory into the central memory and which repeatedly searches for questions in a copy of the general recipe stored in the central memory;

d) the arrangement includes an information device which includes an information base stored in the non-volatile memory, the information in the information base being used to answer or to change questions in the copy of the general recipe stored in the central memory and therewith to produce a specially adapted revision recipe, and e) the arrangement further includes possibilities of handling files in the operating system, whereby a recipe stored in the central memory can be downloaded for storage in the non-volatile memory.

* * * * *